US012566600B2

(12) United States Patent
Burcham et al.

(10) Patent No.: US 12,566,600 B2
(45) Date of Patent: *Mar. 3, 2026

(54) LIMITED USE LINKS FOR DATA ITEM DISTRIBUTION

(71) Applicant: Digital Turbine, Inc., Austin, TX (US)

(72) Inventors: Robert Burcham, Overland Park, KS (US); Kai-Min Sung, Foster City, CA (US); Brandon Brent Ayers, Austin, TX (US)

(73) Assignee: Digital Turbine, Inc., Austin, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/136,452

(22) Filed: Apr. 19, 2023

(65) Prior Publication Data

US 2024/0354085 A1 Oct. 24, 2024

(51) Int. Cl.
*G06F 8/60* (2018.01)
*H04L 69/329* (2022.01)
(52) U.S. Cl.
CPC .............. *G06F 8/60* (2013.01); *H04L 69/329* (2013.01)
(58) Field of Classification Search
CPC ................................. G06F 8/60; H04L 69/329
See application file for complete search history.

(56) References Cited

U.S. PATENT DOCUMENTS

| | | | | |
|---|---|---|---|---|
| 6,061,733 A * | 5/2000 | Bodin | ..................... | H04L 67/06 |
| | | | | 709/233 |
| 7,069,294 B2 * | 6/2006 | Clough | .................... | G06F 8/60 |
| | | | | 717/174 |
| 8,832,817 B2 * | 9/2014 | Cohen | ................... | G06F 21/629 |
| | | | | 726/28 |
| 10,353,686 B1 * | 7/2019 | Pasha | ......................... | G06F 8/61 |
| 11,816,463 B1 * | 11/2023 | Freeland | ................... | G06F 8/60 |
| 2006/0107327 A1 * | 5/2006 | Sprigg | .................... | G06F 21/10 |
| | | | | 726/26 |
| 2008/0301231 A1 * | 12/2008 | Mehta | ....................... | G06F 8/61 |
| | | | | 709/204 |
| 2012/0032945 A1 * | 2/2012 | Dare | ....................... | G06F 9/451 |
| | | | | 345/418 |
| 2015/0242643 A1 * | 8/2015 | Hankins, Jr. | ........... | H04L 63/04 |
| | | | | 726/26 |
| 2016/0292441 A1 * | 10/2016 | Stuntebeck | ......... | G06F 21/6218 |
| 2020/0210165 A1 * | 7/2020 | Pisal | ........................ | G06F 8/61 |
| 2020/0250176 A1 * | 8/2020 | Padmanabhan | ........... | G06F 8/61 |
| 2021/0021600 A1 * | 1/2021 | Ojha | .................... | H04L 63/102 |

* cited by examiner

*Primary Examiner* — Wei Y Mui
*Assistant Examiner* — Brahim Bourzik

(57) ABSTRACT

A distribution server for controlling data item downloads maintains at least one download constraint for a respective data item. When a query for permission to download the data item is input from a user device, the distribution server checks whether the download constraints are met. When the respective download constraints are met, a response is sent to the user device that the download is permitted. When the respective download constraints are not met, a response is sent to the user device that the download is prohibited.

16 Claims, 12 Drawing Sheets

LIMITED USE LINKS FOR DATA ITEM DISTRIBUTION

FIELD AND BACKGROUND OF THE INVENTION

The present invention, in some embodiments thereof, relates to downloading data items to devices and, more specifically, but not exclusively, to controlling data item download to devices.

Content providers often want to allow users to download data items such as files, documents and applications. A common way of giving users access to the data item is using a link displayed in a web page or app. Typically, when the user selects the link the device is connected to an app store or to a web server that provides access to the data item.

Many difficulties arise when the content provider wants to control aspects such as how many times the data item may be downloaded or who has access to the data item. Currently content providers have very limited tools for obtain this control. One way a content provider can limit downloads is to change the address of the data item so that the web page link no longer directs the device to the correct address. However in this case the user will see an error message of download fail, with no way to know why the download failed and whether another attempt may be successful. In another case the data item (e.g. app) may be removed from the app store, again frustrating the user.

Additionally, downloading a data item over the Internet often requires significant user interaction. In some cases the user must first log in to the website or app store with a user name and password. Some websites require multi-factor authentication or a CAPTCHA test before the item can be downloaded.

SUMMARY OF THE INVENTION

It is an object of the present disclosure to describe a server, device and method for controlling the distribution of data items according to specified constraints.

Embodiments of the invention provide a technical solution to the problem of controlling data item download onto a device. One technical solution is to use a distribution server which may communicate with a download client that runs on the user device. The distribution server maintains respective download constraint(s) for each data item whose distribution it controls. When a limited use link for downloading the data item is selected by the user, the download client queries the distribution server for permission to download the data element. The distribution server determines if the download constraints are fulfilled, and either permits or prohibits the download. If download is permitted, the download client either downloads the data item itself or passes the download to a different application running on the user device.

Optionally, the download constraints are specified by the source of the data item (denoted herein the content provider).

Examples of download constraints include but are not limited to:

a) A maximum permitted number of downloads;
b) Device(s) permitted to download the data item; and
c) Network(s) the data item may be downloaded over.

In one example, the content provider requests a limited use link from the distribution server. The request specifies the constraints which the distribution server will check if an attempt is made to download the data item pointed to by the link. The distribution server stores the constraints associated with the data item and provides the limited-distribution link to the content provider.

In a second example, the functions of providing the limited use link and of responding to a user device query are performed by different hardware and/or virtual machines.

This solution is an improvement of the state current art, in which there is no centralized element capable of ensuring that data items are downloaded only under specified conditions.

Optionally, download client running on the device initiates data item download only if permission is received from the distribution server. If the distribution server prohibits the download, the download client does not attempt to download the data item. Therefore failure of the download process due to following an invalid link, for example, is avoided. Furthermore, the download client may communicate with the user in an informative manner, such as by notifying the user why the download is not permitted. This avoids user dissatisfaction when an application crashes during attempted download or a when an uninformative message from a website or app store is displayed after download failure.

Optionally, the download client runs in the background during data item download and the current app continues to run in the foreground. Thus the data item may be downloaded with minimal user interaction while maintaining user interaction with the current app.

The centralization of download control at by a server or servers results in the following benefits:

a) Improved control—Optionally, it is possible to control which network is used to download the data item and enable/disable downloading to a specific device.

b) Improved distribution—Optionally, the data item (e.g. text file, video file or APK) may be downloaded directly from external storage, making it is possible to provide different users with versions of the data item that are targeted for a specific audience (versus a generic data item available at an app store or web page link).

c) Improved speed—Optionally, information about progression of the download process (e.g. pop-ups, banners, etc.) may be generated by the download client on the device and not received from an external source.

d) Improved usability—Optionally, minimal interaction is required from the user. The download client optionally runs in the background during download of the data item, leaving the user free to continue with other activities without distraction.

e) Improved accuracy—Optionally, the data item is downloaded by direct communication between the device and a software repository storing the data items, without an intermediary such as the app store. By removing additional parties from the download process, connection errors and crashes are reduced.

f) Improved protection—Optionally, the download client and distribution server provide a closed ecosystem which accurately and reliably traces the user funnel from click to download to install to first open.

According to an aspect of some embodiments of the present invention there is provided a distribution server and device for controlling data item downloads. The distribution server maintains at least one download constraint for a respective data item and responds to a user device query for permission to download the data item based on whether the respective download constraints are met or unmet. The download constraints can include a device list or a network list, with the download constraint being met when the device or network identifier in the query is present in the list and unmet when absent. Additionally, a maximum download count can be used as a download constraint.

The device is adapted to run software applications and is configured to identify when a link for downloading a data item having download constraints is selected by user interaction with a first software application running on the device. In response, a second software application is invoked to query the distribution server for permission to download the data item, and perform a download failure action when the download is prohibited by the distribution server. The download failure action can include displaying a download failure message or redirecting the device to a web page with a link to the data item.

According to an aspect of some embodiments of the present invention there is provided a method for controlling data item downloads by a server, which involves obtaining at least one download constraint for a respective data item and responding to a user device query for permission to download the data item based on whether the respective download constraints are met or unmet. The method includes inputting a request for a link to the data item with the download constraints, generating a link for limited distribution, and returning the link. The download constraints can include a device list, a network list, or a maximum download count.

In summary, some embodiments of the claimed invention is a system and method for controlling the distribution and download of data items, such as software applications, from a server to user devices. The system includes a distribution server that maintains download constraints for each data item and responds to user queries for permission to download the data item based on those constraints. The download constraints can include device lists, network lists, and maximum download counts.

The system also includes a device adapted to run software applications, which identifies when a user selects a link to download a data item with download constraints and interacts with the distribution server to determine whether the download is permitted. The device also performs a download failure action when the download is prohibited by the distribution server.

Some embodiments of the claimed invention also includes a method for controlling data item downloads by a server, which involves obtaining download constraints for each data item and responding to user queries for permission to download the data item based on those constraints. The method can also involve generating a link for limited distribution of the data item based on the download constraints.

Overall, some embodiments of the claimed invention provide a way for software distributors to control the distribution and download of their software applications, ensuring that they are only downloaded by authorized devices and networks and limiting the number of downloads to prevent unauthorized distribution.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
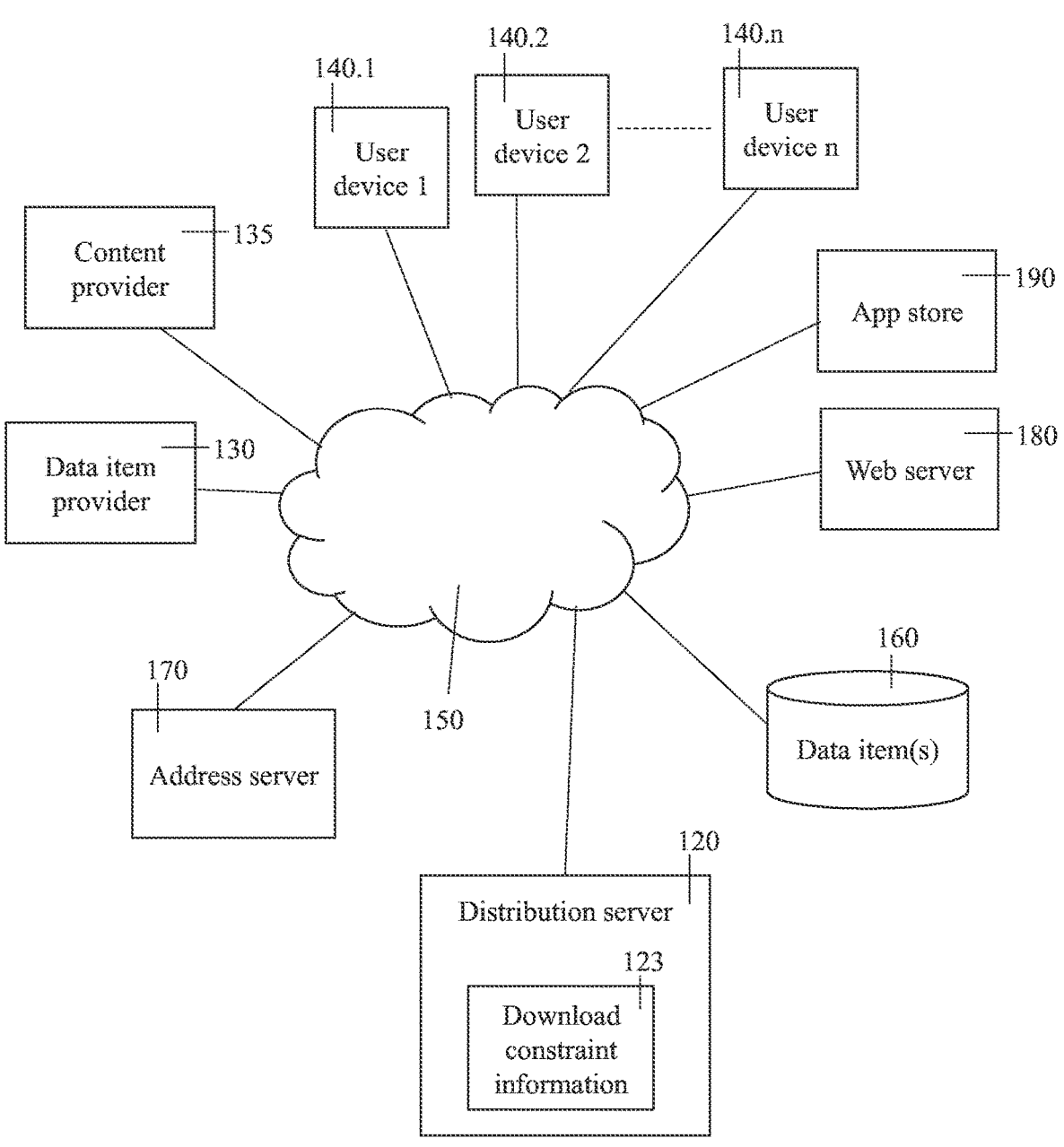
FIG. 1 is a simplified network diagram of a system for controlled download of data items, according to some embodiments of the invention.

The present invention, in some embodiments thereof, relates to downloading data items to devices and, more specifically, but not exclusively, to controlling data item download to devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

I. Network

Reference is now made to FIG. 1, which is a simplified diagram of network elements communicating over a network in order to control download of data items, according to some embodiments of the invention. For clarity, a non-limiting example having a single network 150 connecting the elements involved controlled data item download. In alternate embodiments these elements are connected by multiple networks (e.g. Internet, local area network, etc.) and/or by direct communication between some elements.

Distribution server 120, user devices 140.1-140.n and data item provider 130 communicate by network communication over network 150. Optional embodiments of communication amongst distribution server 120, user devices 140.1-140.n, data item provider 130, and optionally content provider 135, are described in more detail below.

For clarity, some embodiments presented herein describe a single server performing all the functionality required for managing data item distribution on the server side. As will be appreciated by the skilled professional, these functionalities may divided amongst multiple physical and/or virtual machines. For example, a first server-side component may provide the limited use link to a data provider whereas a second server-side component maintains respective constraints for the data items and responds to queries from devices requesting permission to download the data item.

Optionally, user devices may also communicate over the network with one or more of: file repository(s) 160, address server 170, web server 180 and App store 190.

Optionally, when data item download is approved by distribution server 120 the user device downloads the data item directly from repository 160. Alternately, the device downloads the data item via web server 180.

Optionally, when data item download is prohibited by distribution server 120 the download client may redirect the device to app store 170 and/or web server 180 as an alternate way of accessing the data item.

Optionally, data item provider 130 is the network element which requests a link for controlling distribution of a data item and provides the constraints limiting the data item downloads.

Optionally, data item provider 130 provides the limited use link directly to a user device 140. For example, data item provider 130 may embed the limited use link in content provided to user device 140 for display (e.g. as a link in an email or on the website of the data item provider). Alternately or additionally, data item provider 130 provides the limited use link to content provider 135 which embeds it in content to be displayed on the device (e.g. in a web page or app).

Examples of types of data items include but are not limited to:

1) Text file;
2) Spreadsheet file;
3) Image file;
4) Video file;
5) Program file (e.g. software code).

It should be noted that when the data item is a program file, an automatic installation might also followed or performed in parallel to the downloading.

II. Device with Download Client

Figure 2A:
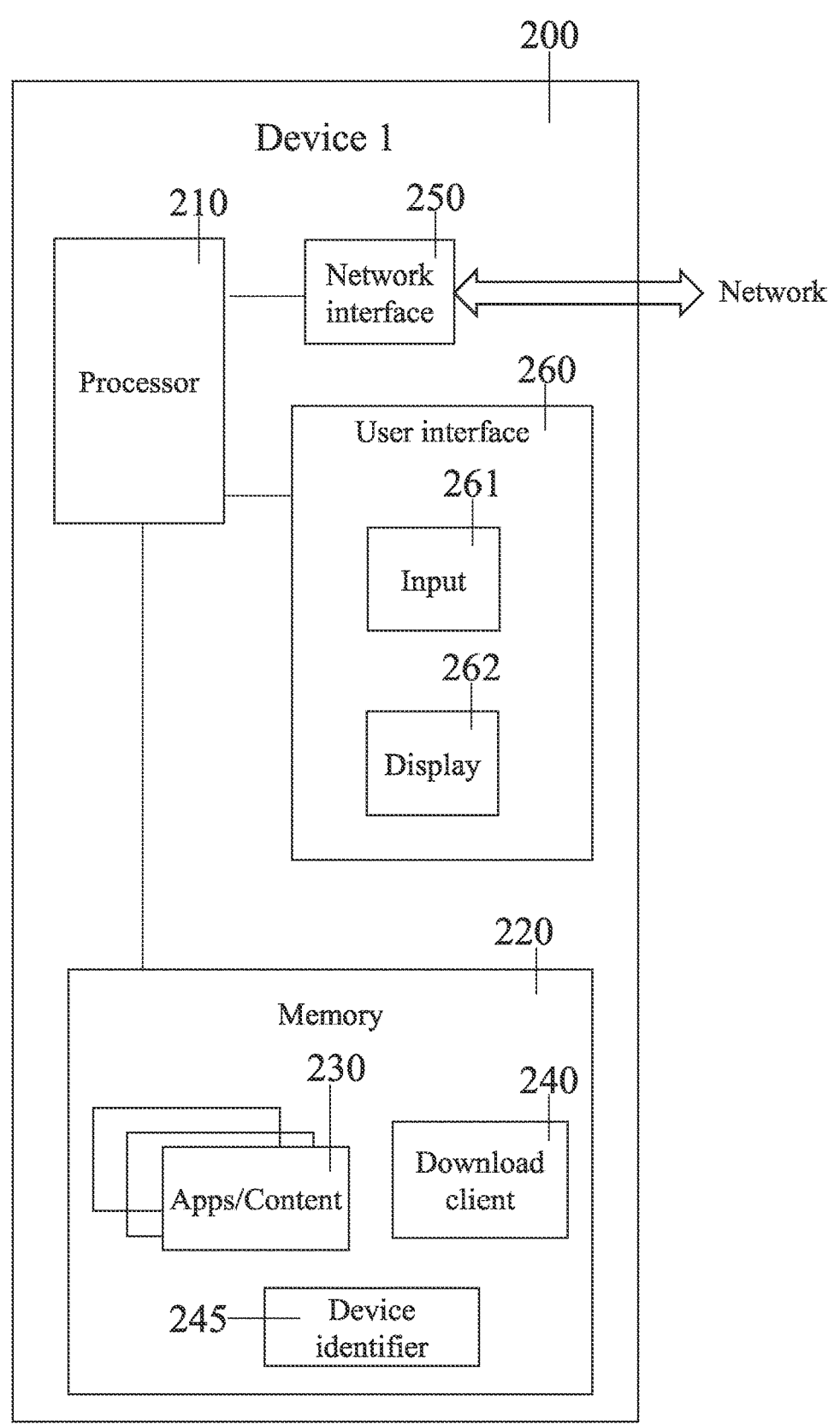
FIGS. 2A-2B are simplified block diagrams of a device for running software applications, according to respective embodiments of the invention.
Figure 2B:
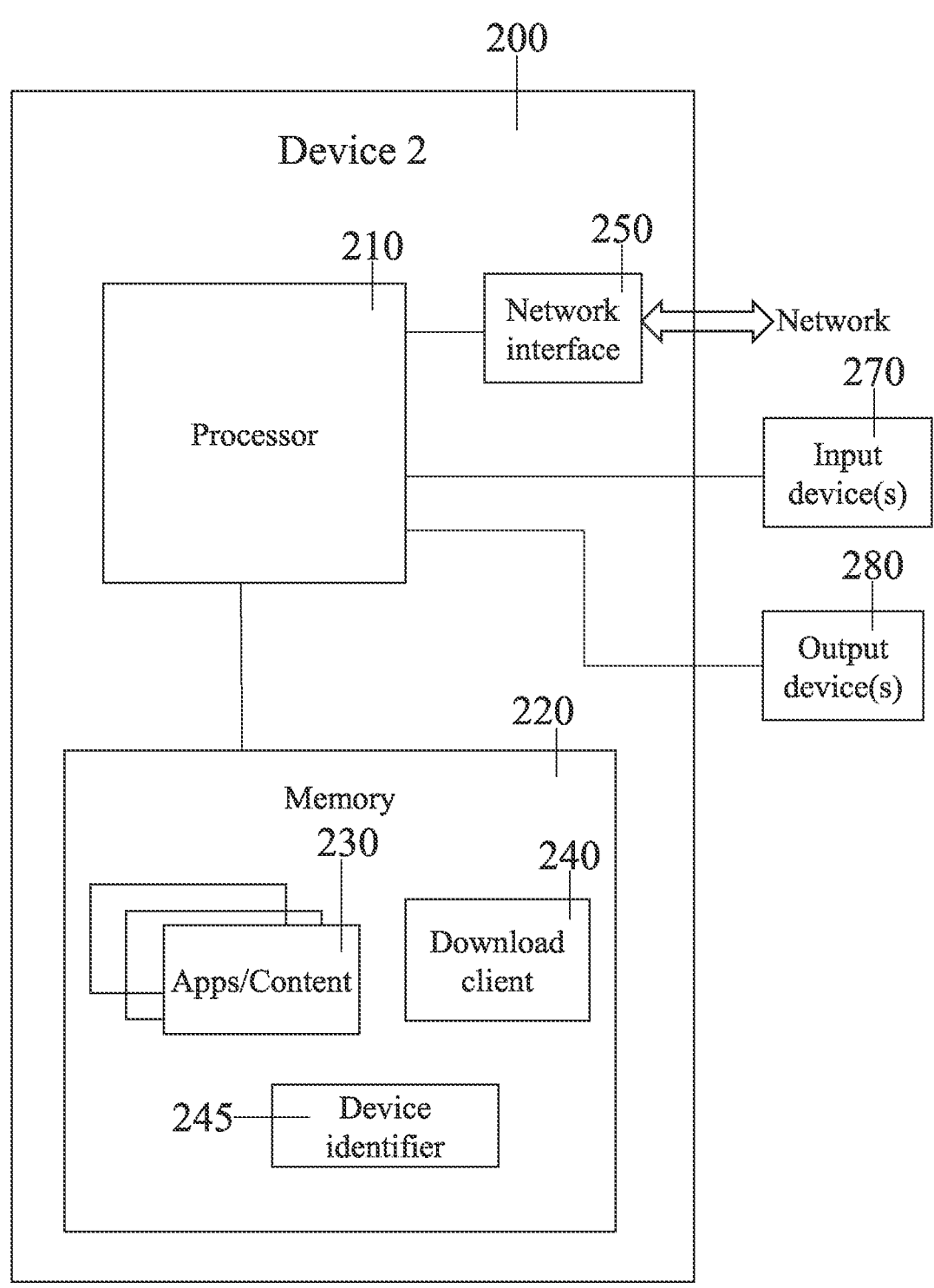

Reference is also made to FIGS. 2A-2B, which are simplified block diagrams of a device for running software applications, according to respective embodiments of the invention.

Both device 1 and device 2 (also referred to herein generally as device 200) include at least one processor 210 and at least one non-transitory memory 220 storing software instructions to be executed by processor 210. The software instructions optionally include code for download client 240. Code for additional apps and other content may also be stored in memory 220.

Device 200 further includes network interface 250 which is used by the device when it communicates with external elements (such as distribution server 120) over a network.

FIG. 2A illustrates exemplary Device 1, which has an internal user interface (UI) 260. UI 260 includes input 261 and display 262. In one example, Device 1 is a mobile telephone and input 261 and display 262 are integrated as a touch screen display.

FIG. 2B illustrates exemplary Device 2, which has external user interface devices. Input device(s) 270 includes one or more devices which enable a user to provide input to the device, for example to select a link for downloading a data item. Examples of input devices include but are not limited to: keyboard, mouse, joystick and microphone. Output device(s) 280 includes one or more devices which enable Device 2 to provide information to a user, for example to display a webpage or application running on the device. Examples of output devices include but are not limited to a video monitor and speakers. In one example, Device 2 is a desktop computer, input device(s) 270 are a mouse and keyboard, and output device 280 is a computer monitor.

Optionally, device 200 has a device identifier 245 (optionally stored in memory 220). Optionally, the device identifier (also denoted device id) is provided by download client 240 when querying the distribution server for permission to download the selected data item.

As used herein the term "data item" means data organized in any way that may be downloaded to the device, such as a data file or software code file.

As used herein the term "distribution server" means a server that provides the limited use link and determines if the distribution constraints are met. As noted herein, distribution server functionality may be split and/or replicated on multiple hardware or virtual machines.

As used herein the term "download client" means an application running on the device and having the role of downloading data items, and optionally performing other actions. The download client may be a standalone client or a component of another client having additional functionalities. Optionally, the download client runs in the background for at least part of the time that it is active.

As used herein "invoking the download client to run on the device" and similar terms means causing the download client to become active in order to perform actions responsive to selection of the limited use link.

As used herein the term "limited use link" means a link which when selected causes the download client to query whether the data item pointed to by the link may be downloaded.

As used herein the term "data item provider" means the entity requesting a limited use link for a particular data item.

As used herein the term "content provider" means the entity which provides content including the limited use link to the device.

Optionally, the data item provider and content provider are the same entity. Alternately, the data item provider and content provider are different entities.

As used herein the term "download constraints" means rules which may be checked against data present in the query and/or externally available to determine if conditions for permitting download of the data item are met (e.g. a maximum permitted number of downloads has not been exceeded).

As used herein the term "the limited use link is selected" and corresponding terms mean receiving input indicating that the data item specified by the limited use link should be downloaded as described herein. The manner in which the selection is performed is based on the capabilities of the device and/or user interface and/or the current app. In one non-limiting example, the limited use link is selected by clicking on the limited use link (e.g. in a web browser). In a second non-limiting example, the limited use link is selected by selecting an item in a list and pressing an enter key.

As used herein, the term "device" means a network-connected device on which software is installed and runs. The term "device" includes both mobile devices (such as mobile phone, tablet, laptop, etc.) and non-mobile devices (such as smart TVs, desktop computers, network enabled devices, etc.).

As used herein, the terms "software application", "application" and "app" mean a software program installed (or to be installed) on a device.

For clarity, some of the embodiments described herein describe a single user device requesting permission to download a single data item. As will be appreciated by the skilled person, a user device may query distribution server 120 for permission to download multiple data items in a single query and distribution server 120 may permit or prohibit downloading the data items individually or as a group.

Figure 3:
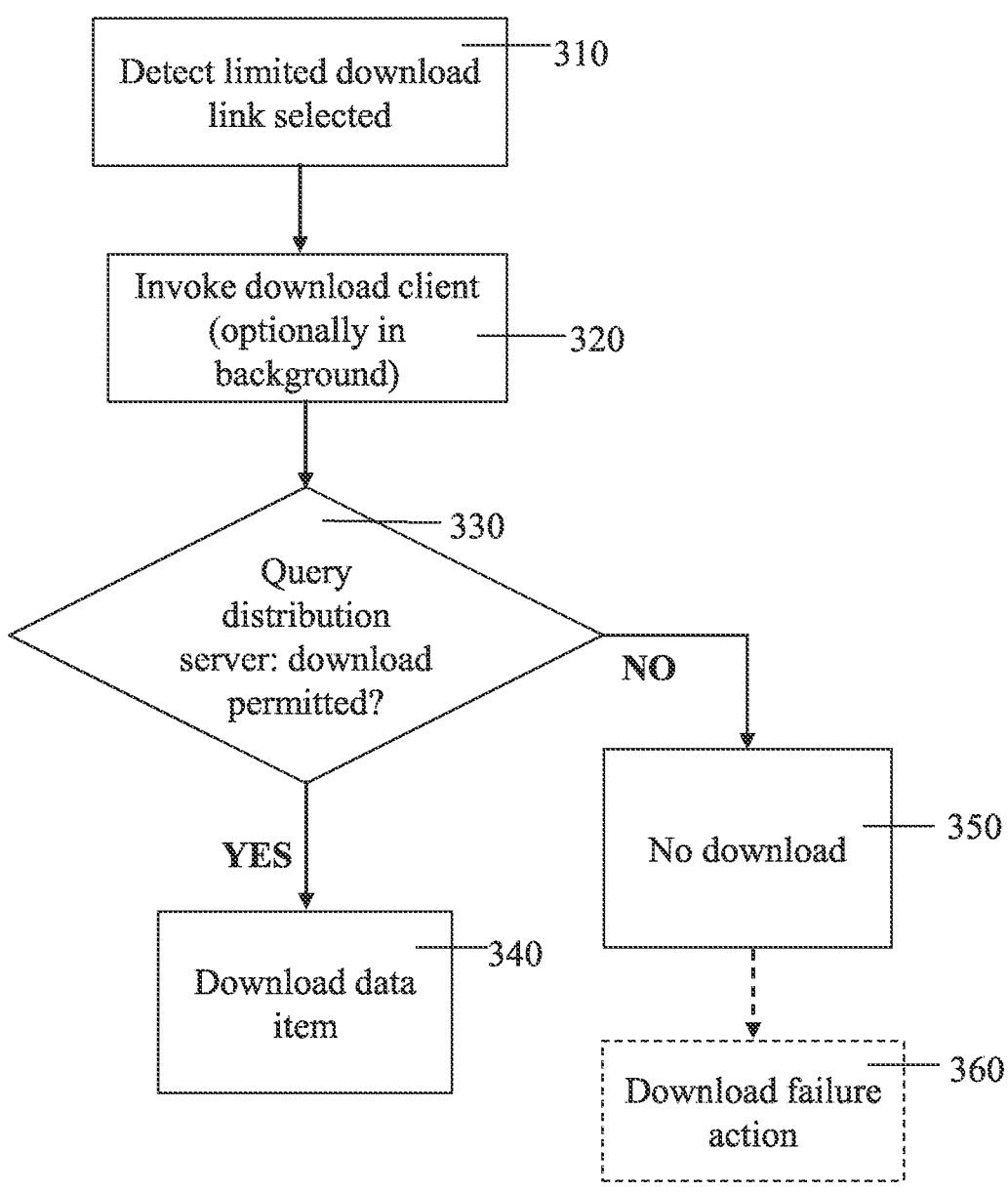
FIG. 3 is a simplified flowchart of a method for downloading data items by a device adapted to run software applications, according to some embodiments of the invention.

Reference is also made to FIG. 3, which is a simplified flowchart of a method for downloading data items by a device adapted to run software applications, according to some embodiments of the invention. The method is performed by processing circuitry on the device. Respective examples of processing circuitry were presented in FIGS. 2A-2B.

In 310, the processing circuitry identifies that a link for downloading a data item having download constraints (also denoted herein a limited use link) is selected by user interaction with a software application running on the device. In response, in 320 a download client is invoked to run on the device.

Optionally, download client 240 runs in the background while the data item is downloaded. The user is thus able to interact with other applications running in the foreground (such as the application that displays the limited use link).

Optionally, download client 240 runs continuously in the background, monitors links as they are selected and detects when a selected link is a limited use link (e.g. based on the link format and/or metadata associated with the link).

In 330, the download client queries the distribution server for permission to download the data item. If the download is permitted, in 340 the data item is downloaded. If the download is not permitted, in 350 no download is performed.

Optionally, if the download is prohibited one or more download failure actions are performed in 360. The download failure action may be any action taken by the device when download is prohibited.

As used herein a downloading action refers to downloading action and to downloading action followed by automatic installation action.

In one example, the download failure action is displaying a download failure message on the UI, In a second example, the download failure action is redirecting the device to a web page which includes a link to the data item.

In a third example, the download failure action is notifying the data item provider that an attempt to download the data item failed.

In a fourth example, the download failure action is to close the download client. Download client 240 may be invoked again when another attempt is made to download a data item with limited distribution (either the same data item or a different data item).

The above examples are not exclusive. More than one of the examples may be performed in 360.

Optionally, download client 240 is closed after the download is complete.

Optionally, the limited use link is a deep link which invokes the download client to install new app. Further optionally, the deep link's format and/or metadata indicate which data item should be downloaded by the download client. In an exemplary embodiment, the download client is registered for a dedicated link format which is not used by other types of applications/clients. When a limited use link having the registered format is selected, the only application on the mobile device able to handle the limited use link is the download client. Thus the download client is automatically invoked for every link having the registered format.

Optionally, an app and/or the device operating system and/or a client running on the device detect when the selected link is the download client's deep link and invokes download client 240.

As used herein a download client is also any client that performs the described downloading action with automatic installation therewith or thereafter.

Optionally, only minimal interaction is required from the user during data item download. In some embodiments the download occurs automatically after selecting the limited use link (e.g. a single click on the link). Alternately or additionally, the first click on the limited use link triggers additional actions including, but not limited to, displaying additional information about the data item and/or obtaining user confirmation of the download (e.g. in a pop-up window and/or banner).

Optionally, the download client prompts the user to confirm downloading the data item prior to the download and performs the download only when the user confirmation is obtained. Further optionally, this prompting includes obtaining information about the data item (e.g. retrieving information from a server on the network) and displaying the information on the UI.

Optionally, the download client resumes running in the background when the user does not confirm downloading the data item (e.g. after a specified amount of time has elapsed since the prompt).

Optionally, the download client displays information regarding the download on the output device. For example, a banner showing progression of the download the data item and/or a notification when the download is completed.

Optionally, the query includes a device identifier which uniquely identifies the device (e.g. an AAID or IMEI). Alternately or additionally, the query includes a network identifier which identifies which network(s) the device is communicating over.

Optionally, the data item is downloaded directly from a data repository and/or other network-connected memory (e.g. from the cloud).

Optionally, the data item is installed after the download is completed.

Non-limiting examples for how the device obtains address information to access the data item include:
a) Returned by the distribution server along with permission to download the data item.
b) Querying an address repository (e.g. on an external server) over the network and receiving the address information in response to the query.
c) Constructing the address using information present in the limited use link (for example by retrieving the address from a non-transitory internal memory on the device);

Optionally, the processing circuitry automatically opens the data item upon completion of the download.

Optionally, when the data item includes program instructions (e.g. is a file for installing or updating an app) the instructions are automatically executed when the download is complete.

Optionally, when a download client is unavailable on a device, instructions for automatic downloading and installing are received and executed. These actions may be performed by other software installed on device 200 (e.g. by a different background client or by the current app).

Examples of situations in which a download client is unavailable on a device include, but are not limited to:
a) The download client is not installed on the device;
b) The incorrect version of the download client is installed on the device; and
c) Invocation of the download client fails.

III. Distribution Server

For clarity, some embodiments are described herein as being performed by a single server communicating with a single device. As will be appreciated by the skilled professional, distribution server may be in communication with multiple user devices and permit or prohibit downloads in response to respective queries from multiple user devices. Additionally, server-side operations that are taken to limit distribution of data items may be performed by a single server or multiple servers.

Figure 4:
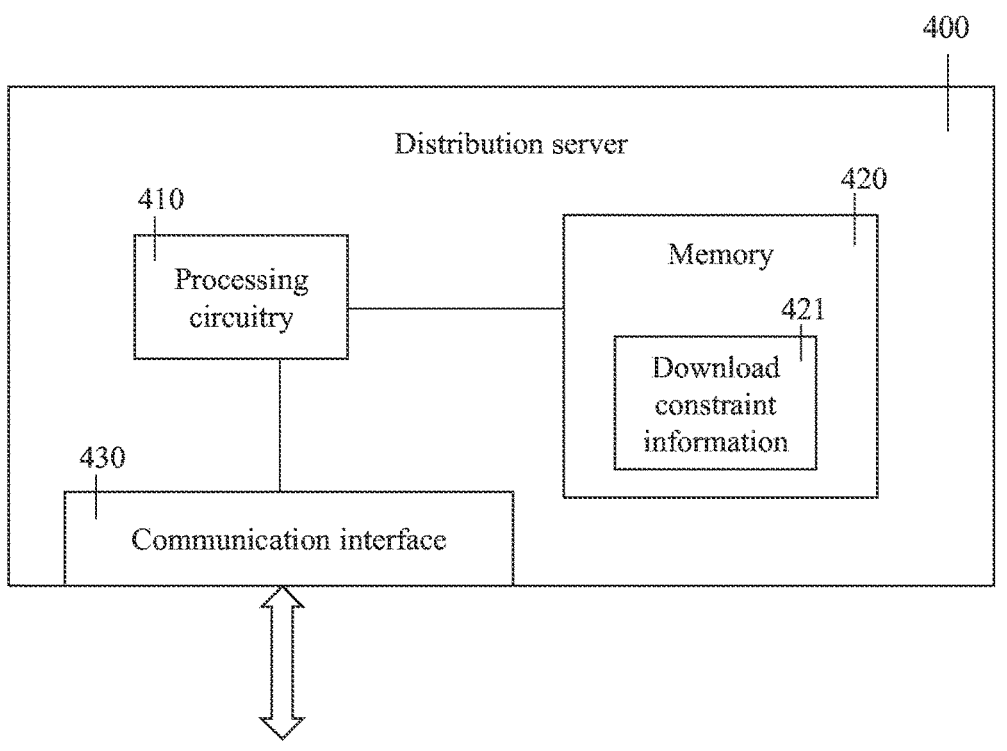
FIG. 4 is a simplified diagram of a distribution server, according to some embodiments of the invention.

Reference is also made to FIG. 4, which is a simplified diagram of a distribution server, according to some embodiments of the invention. In some embodiments of the invention, distribution server 400 performs one or more tasks which limit downloads of a data item. Data item download is permitted only when specified constraint(s) for the data item are satisfied.

Distribution server 400 includes processing circuitry 410. Processing circuitry 410 may include one or more hardware processors running on the same or different devices. Processing circuitry 410 may be deployed on one or more machines, including but not limited to hardware server(s) and/or web server(s) and/or virtual machine(s) and/or container environment(s) running on hardware machine(s). Each of the machines may include one or more processors.

Optionally, display system 400 includes additional hardware elements. Examples of such hardware elements include but are not limited to:
a) Internal memory 420—may store software instructions to be executed by processing circuitry 410 and/or download constraints 421 and/or other data; and
b) Communication interface 430—communicates over a network with client devices, and optionally other network elements such as the content provider 130 and/or address server 170.

Optionally, distribution server 400 performs one or more of the following non-limiting list of operations:
1) Providing a limited use link for downloading the data item;
2) Obtaining respective download constraints for the data item;
3) Storing the respective download constraints for the data item; and
4) In response to a query requesting permission to download the data item, determining whether the constraints are met and permitting or prohibiting data item download accordingly.

Figure 8:
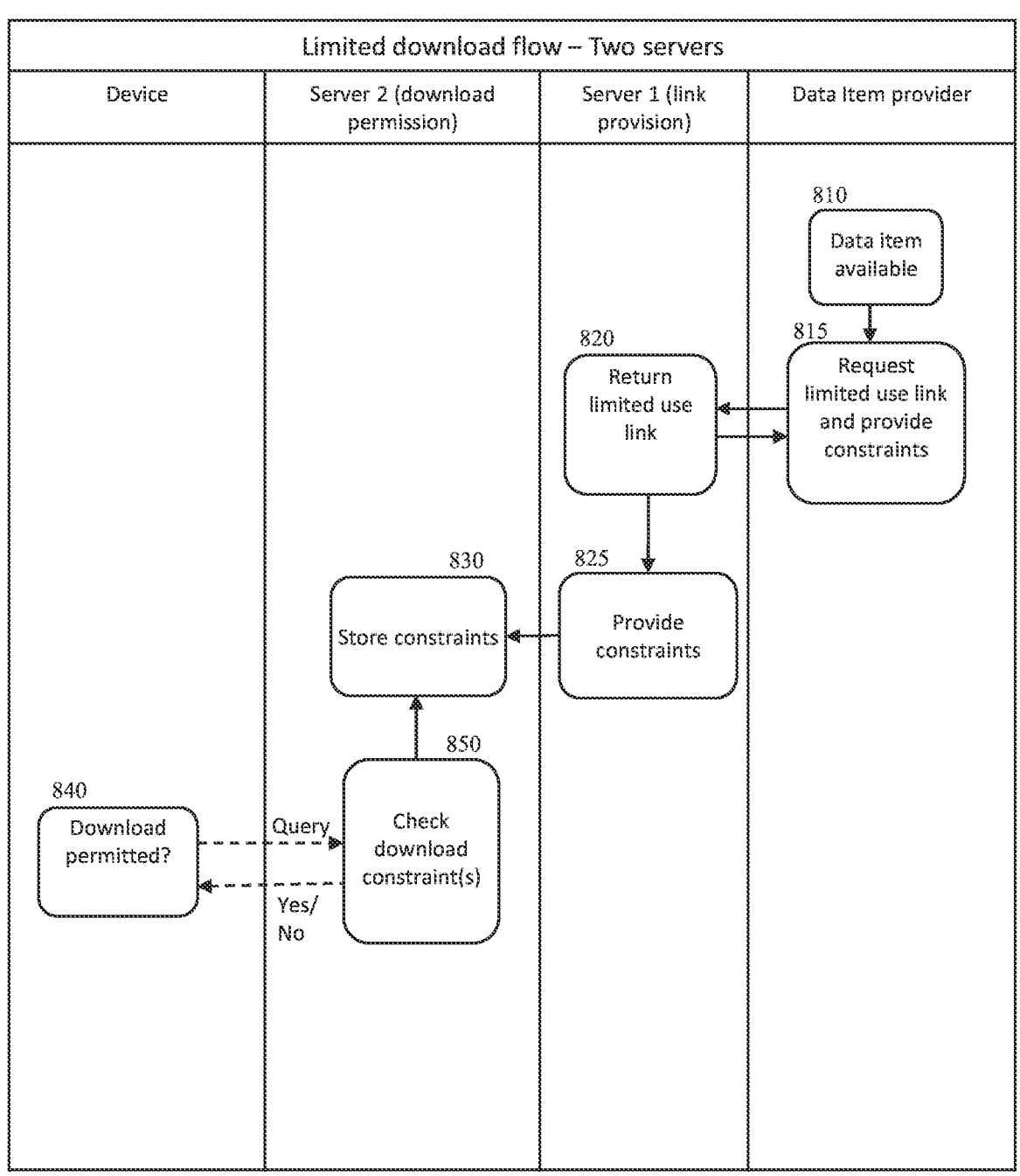

In alternate embodiments, the operations are not all performed by the same server. For example, a first server might provide the limited use link and obtain the respective download constraints. The first server may pass data item information (e.g. an identifier of the data item, respective download constraints, etc.) to a second server. The second server stores the download constraints and responds to queries requesting permission to download. An exemplary embodiment is illustrated in FIG. 8.

Figure 5:
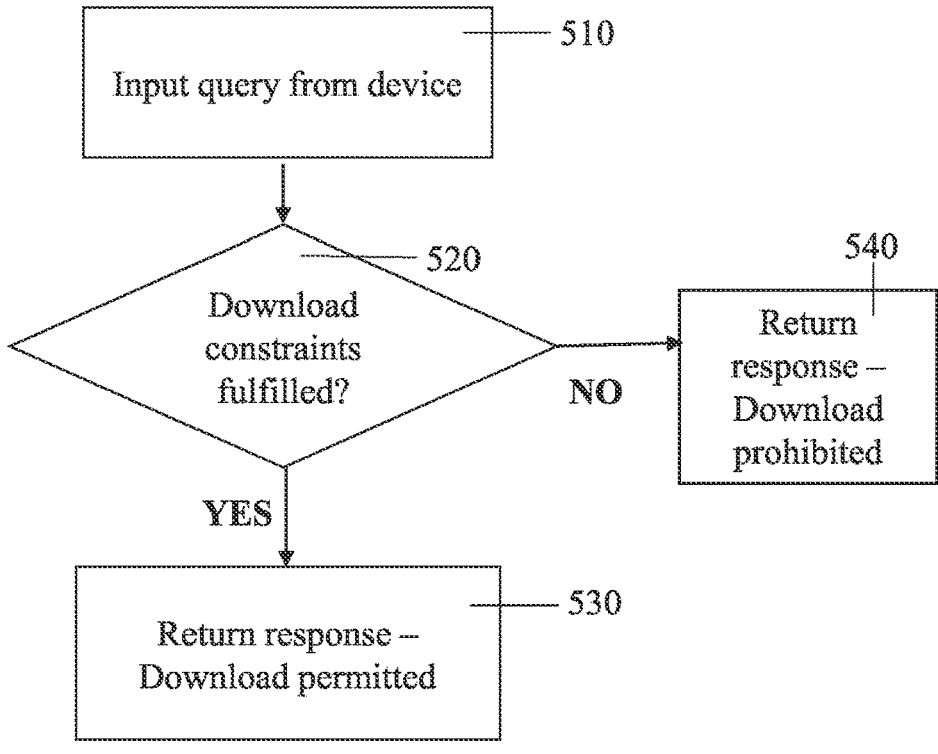
FIG. 5 is a simplified flowchart of a method for controlling data item downloads, according to some embodiments of the invention.

Reference is also made to FIG. 5, which is a simplified flowchart of a method for controlling data item downloads, according to some embodiments of the invention. Optionally, the method is performed by one or more servers as described herein.

In 510 an input is received from a user device. The input includes a query for permission to download a data item. Optionally, the query includes additional data used to determine whether the constraints are or are not met. For example, the query may include a device identifier and/or one or more network identifiers.

In 520 the respective download constraints for the data item are checked to determine if they are or are not met.

If the download constraints are met, in 530 a response is sent to the user device that the download is permitted. If the download constraints are not met, in 540 a response is sent to the user device that the download is prohibited (i.e. not permitted).

Optionally, in 520 the decision whether the download constraints is based on information maintained by the server (for example stored on the server or otherwise accessible to the server).

Figure 10:
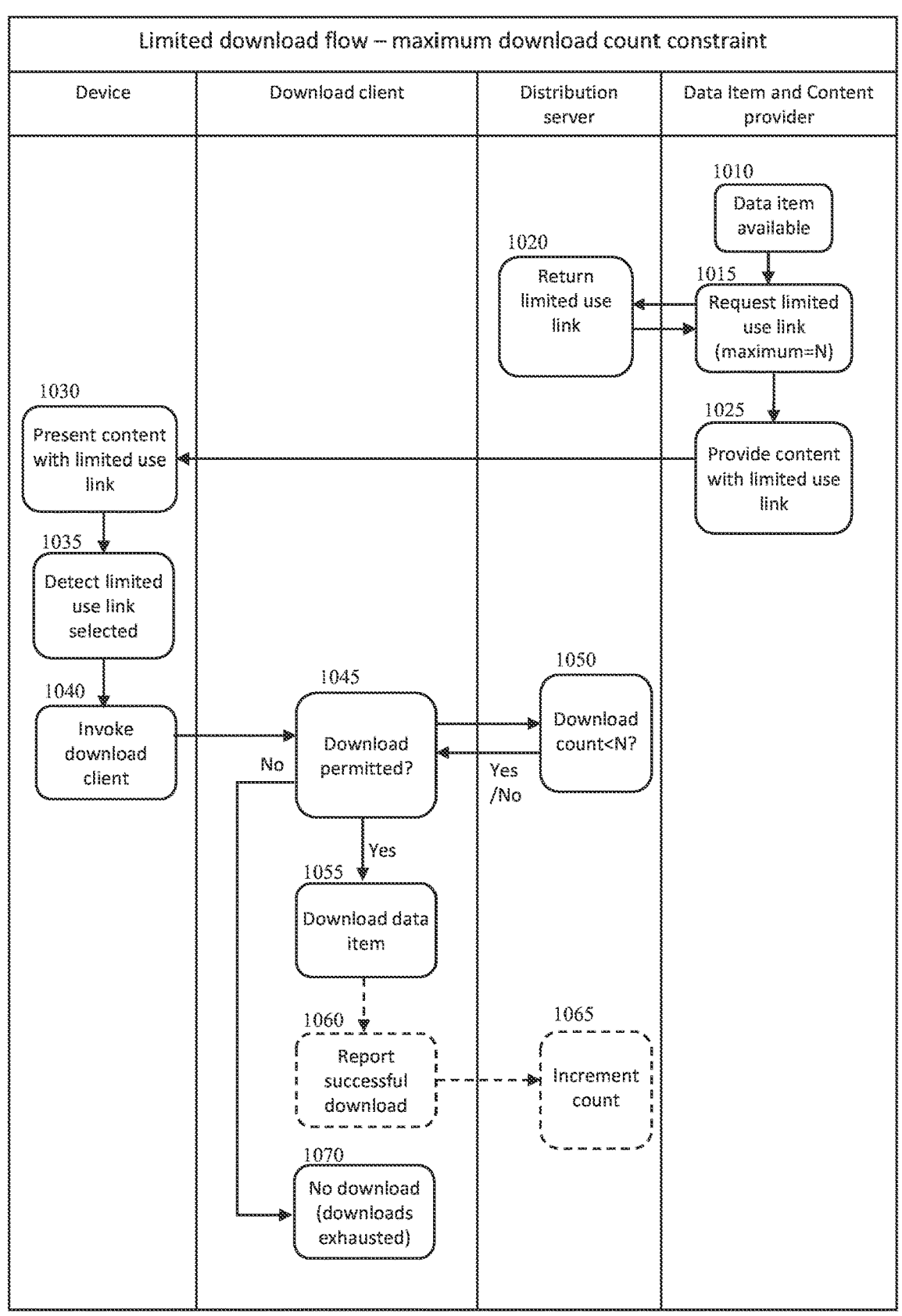

In one example, the download constraint is a maximum permitted number of downloads (see FIG. 10). The server keeps a running count of successful downloads and/or requests for permission to download. After the count reaches the maximum permitted number, the server does not permit the user device to download the data item.

Figure 11:
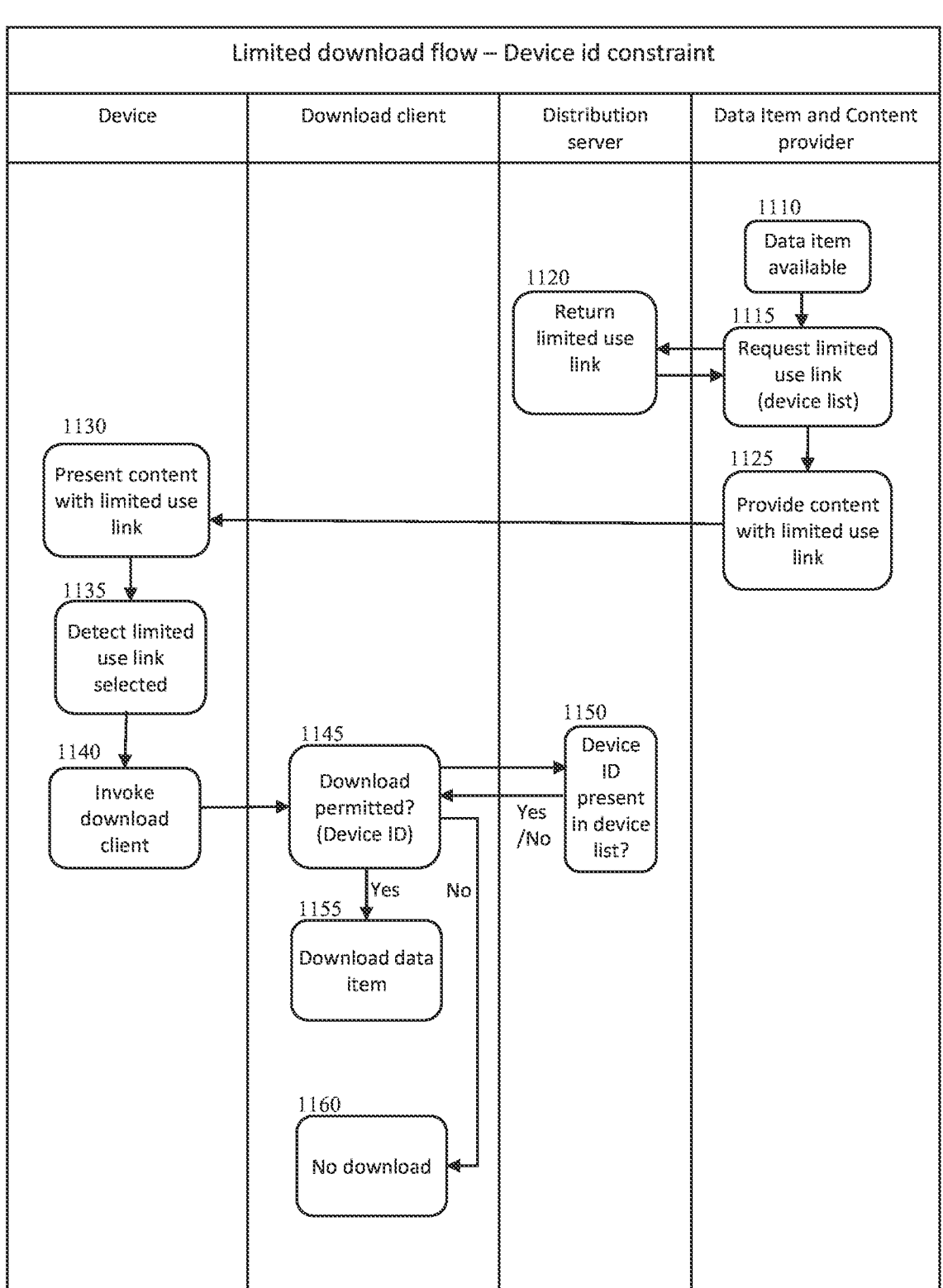

In a second example, the download constraint is based on the device identifier (see FIG. 11). The server stores a list of identifiers of one or more devices permitted to download the data item. The query includes a device identifier. The server approves the download only if the device identifier in the query is in the list of permitted devices.

Figure 12:
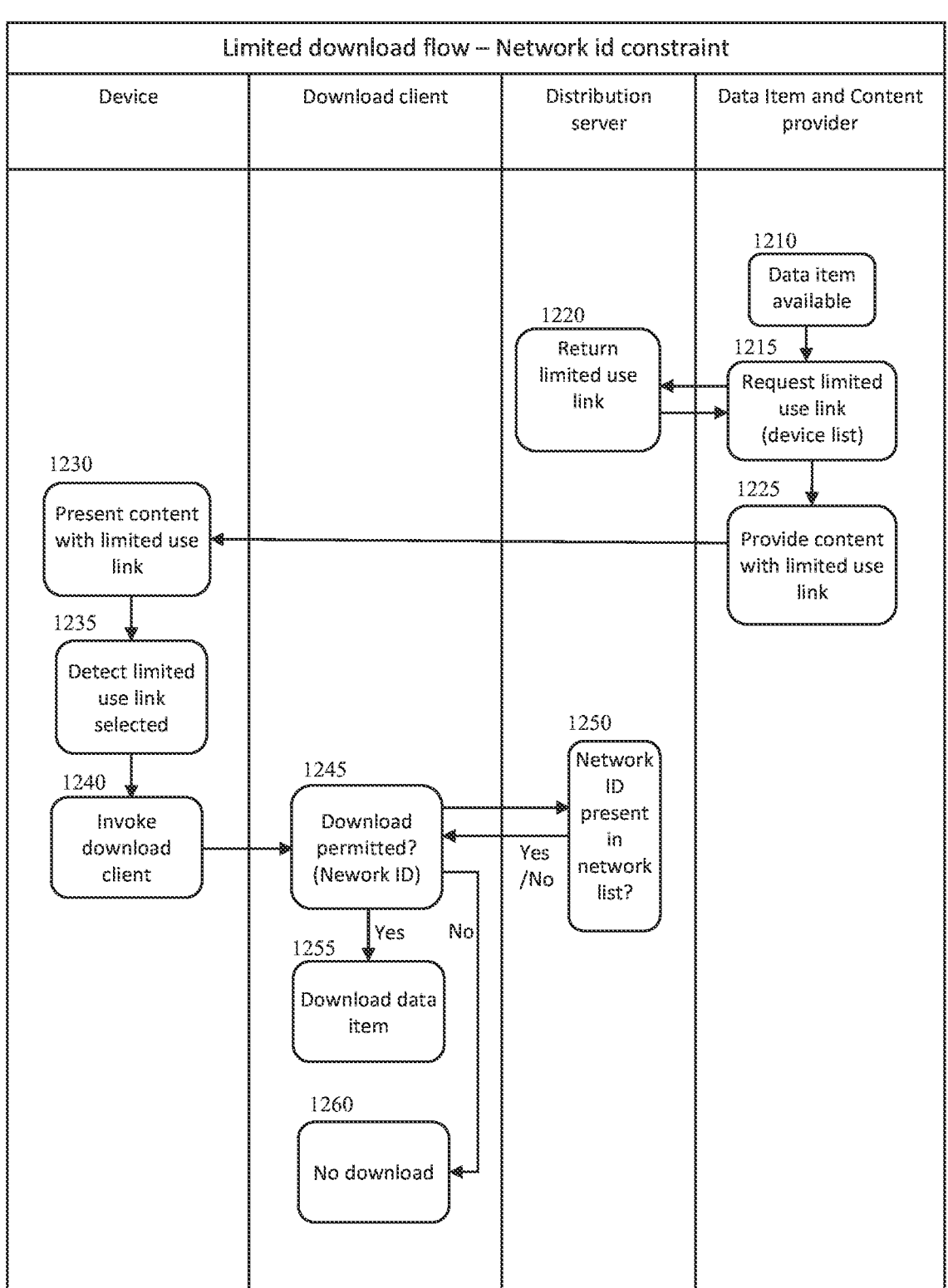

In a third example, the download constraint is based on the network identifier (see FIG. 12). The server stores a list of identifiers of one or more networks that the data item may be downloaded to. The query includes a network identifier. The server approves the download only if the network identifier in the query is in the list of permitted networks.

In a fourth example, the download constraint is a blacklist of networks that cannot be used for data item download.

In the third and fourth examples the network identifier may be derived from the network transport upon which the query is made.

Optionally, there are multiple download constraints and the download is permitted only if all the constraints are met. Combinations of download constraints include:

a) Maximum count and device ID;

b) Maximum count and network ID;

c) Device ID; and d) Network ID;

e) Maximum count and device id and network ID.

The order in which the constraints are checked may vary according to implementation and/or multiple constraints may be checked in parallel.

Figure 6:
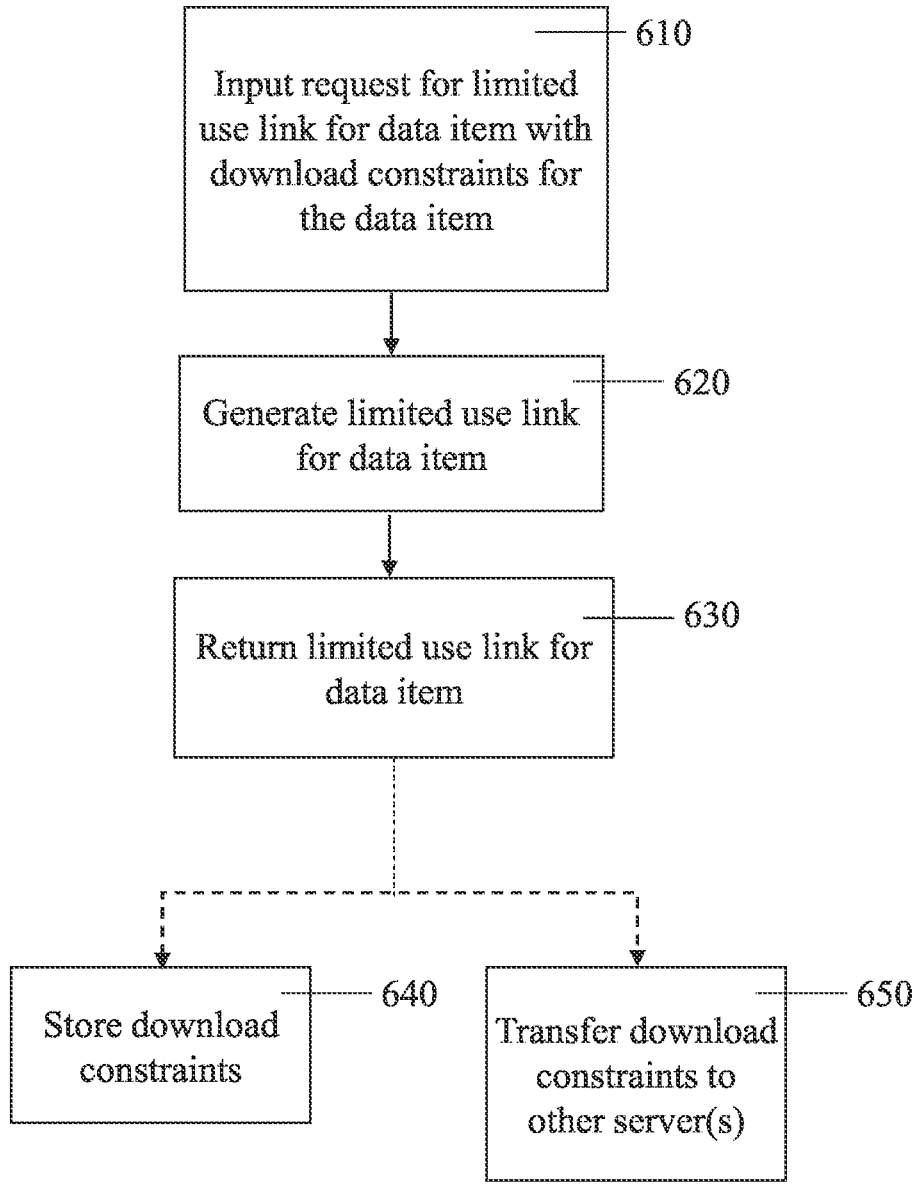
FIG. 6 is a simplified flowchart of a method for obtaining download constraints according to some embodiments of the invention.

Reference is also made to FIG. 6, which is a simplified flowchart of a method for obtaining download constraints according to some embodiments of the invention.

In 610, a request for a limited use link to the data item is input. The request includes one or more download constraints for the data item.

In 620, a limited use link for the data item is generated in response to the request. Optionally, the link format and/or metadata are configured to permit a download client or other app running on the device to identify that permission must be obtained before the data item is downloaded. This triggers the device to send a query to a distribution server requesting permission to download the data item.

In, 630 the generated limited use link is returned to the requester.

FIG. 6 illustrates two optional further operations which may be performed in order to maintain the download constraint information. In 640, the download constraints are stored in internal or external memory, from which they can be accessed when a query for that data item is received. Alternately or additionally, in 650 the download constraints are transferred to one or more different servers, which will handle permitting or prohibiting download of the data item.

Figure 7:
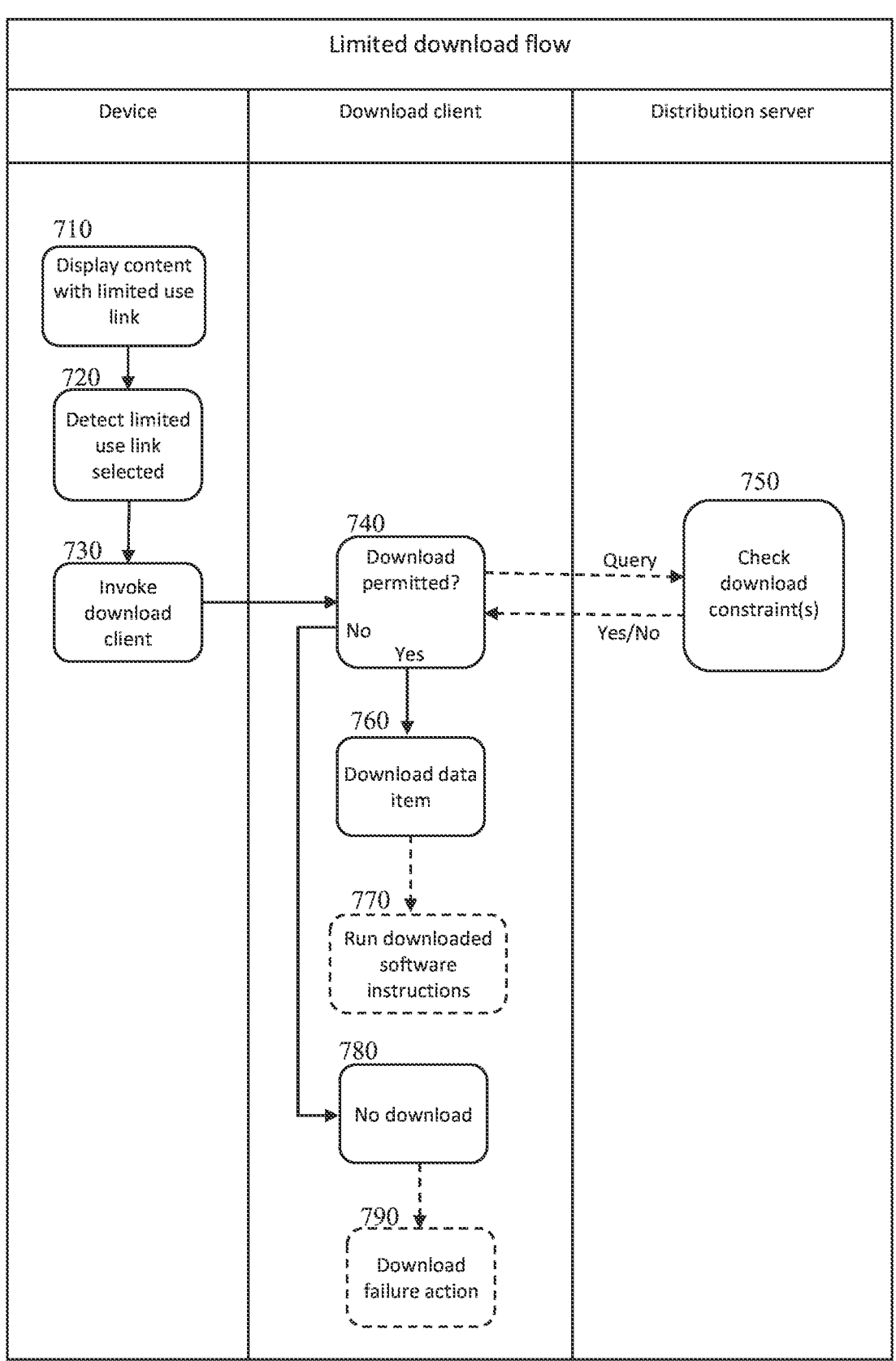
FIGS. 7, 8, 9, 10, 11 and 12 are simplified flow diagrams illustrating respective exemplary embodiments of the invention.

Reference is also made to FIG. 7, which is a simplified flow diagram illustrating an exemplary embodiment of the invention.

The device displays content with a limited use link 710. When the limited use link is selected 720, the download client is invoked 730. The download client queries the server if download is permitted 740. The distribution server checks the download constraints(s) and responds to the query 750.

If download is permitted, the download client downloads the data item 760. As noted above, in some embodiment the download client does not download the data item but instead triggers or instructs a different app to perform the download. Optionally, the data item includes program instructions and the program instructions are run after download 770.

If download is not permitted, the download client does not download the data item 780. Optionally, a download failure action is performed 790.

Reference is also made to FIG. 8, which is a simplified flow diagram illustrating an exemplary embodiment of the invention with multiple servers. In the embodiment of FIG. 8. Server 1 generates the limited use link and Server 2 checks the constraints to check if download may be permitted are performed by separate servers.

The data item provider has an available data item and would like to limit distribution of that data item 810. The data item provider requests a limited use link from Server 1 and provides constraints for limiting the data item download 815. Server 1 returns a limited use link to data item provider 820 and provides the constraints to Server 2 825. Server 2 stores the constraints for later use 830. When the device sends a query to Server 2 840, Server 2 checks the download constraints and determines whether download is permitted or prohibited 850.

Figure 9:
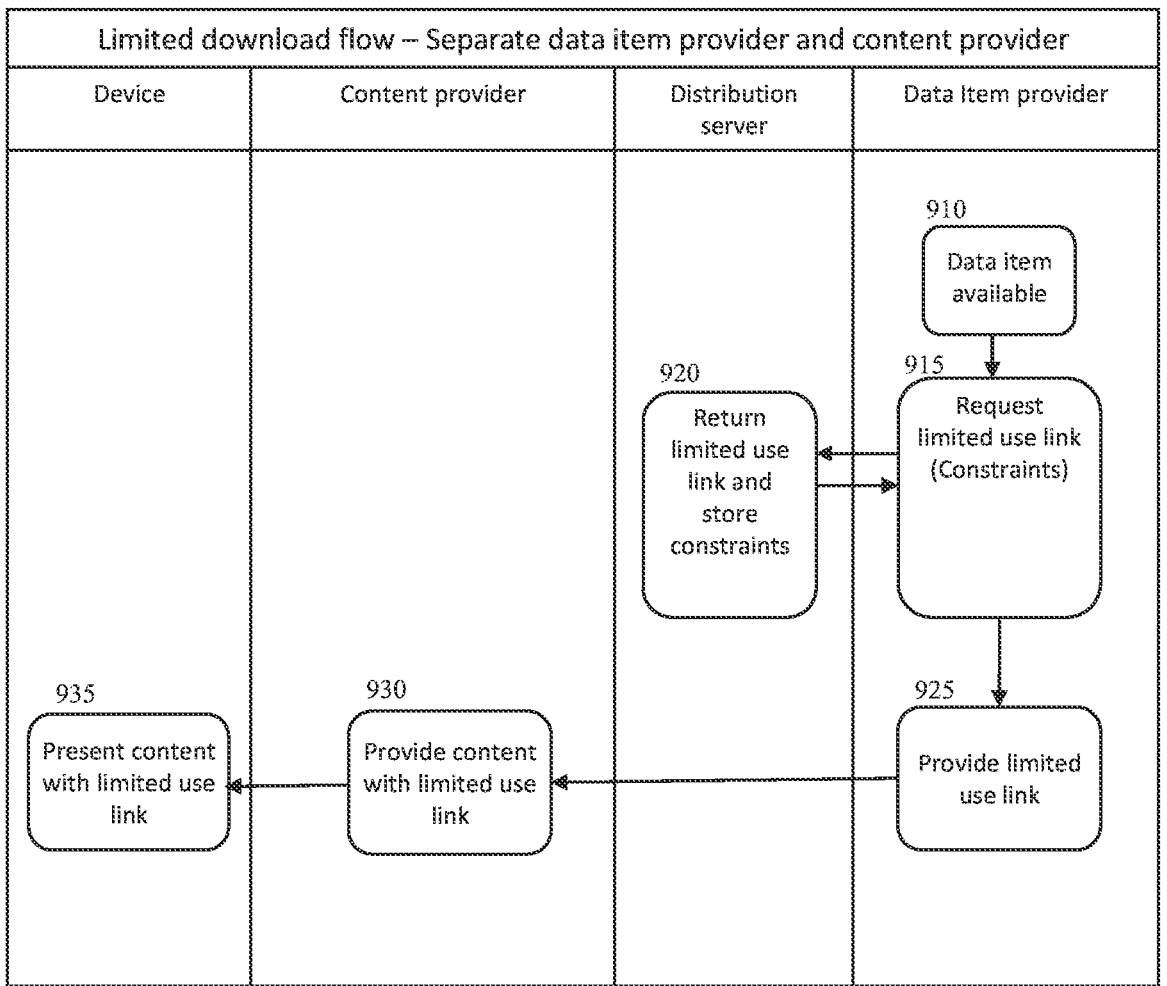

Reference is also made to FIG. 9, which is a simplified flow diagram illustrating an exemplary embodiment of the invention. In the embodiment of FIG. 9, the data item provider and content provider are separate entities.

The data item provider has an available data item and would like to limit distribution of that data item 910. The data item provider requests a limited use link from the distribution server 1 and provides constraints for limiting the data item download 915. The distribution server returns a limited use link to data item provider 920. The data item provider provides the limited use link to the content provider 925. The content provider provides content with the limited use link to the device 930. The device presents the content with the limited use link available for user selection 935.

IV. Download Constraint Examples

Reference is also made to FIGS. 10-12, which are simplified flow diagrams illustrating respective exemplary embodiments of the invention. FIGS. 10-12 each illustrate checking a single constraint in order to determine whether data item download may be permitted. The constraints are respectively the maximum permitted number of downloads, a device id and a network id.

Referring to FIG. 10, data item provider has an available data item and would like to limit distribution of that data item 1010. The data item provider requests a limited use link from the distribution server 1, where the request includes maximum number of permitted downloads (N) 1015. The distribution server returns a limited use link to data item provider 1020. The data item provider provides content with the limited use link to the device 1025. The device presents the content with the limited use link available for user selection 1030. The device detects that the limited use link has been selected 1035, and invokes the download client 1040. The download client queries the distribution server whether download is permitted 1045.

The distribution server maintains a count of how many times the data item has been downloaded. If the current count is less than N, the distribution server responds that data item download is permitted 1050. If download is permitted, the download client downloads the data item 1055. Optionally, the download client reports to the distribution server when a download has been successful 1060, and the distribution server increments the count 1065.

If the distribution server prohibits download, the download client does not download the data item 1070. Optionally, download client displays a message on the device indicating that a data item was not downloaded (e.g. "downloads exhausted").

Referring to FIG. 11, data item provider has an available data item and would like to limit distribution of that data item 1110. The data item provider requests a limited use link from the distribution server 1 and provides device ids of one or more devices permitted to download the data item 1115. The distribution server returns a limited use link to data item provider 1120. The data item provider provides content with the limited use link to the device 1125. The device presents the content with the limited use link available for user selection 1130. The device detects that the limited use link has been selected 1135, and invokes the download client 1140. The download client queries the distribution server whether download is permitted and provides its device id 1145.

The distribution server checks if the device id in the query is in the list of device ids given by the data item provider 1150. Download is permitted if the device id is in the list and prohibited if the device id is not in the list. If download is permitted, the download client downloads the data item 1155. If the distribution server prohibits download, the download client does not download the data item 1160. Optionally download client displays a message on the device indicating that a data item was not downloaded.

Referring to FIG. 12, data item provider has an available data item and would like to limit distribution of that data item 1210. The data item provider requests a limited use link from the distribution server 1 and provides network ids for one or more networks that the data item may be downloaded over 1215. The distribution server returns a limited use link to data item provider 1220. The data item provider provides content with the limited use link to the device 1225. The device presents the content with the limited use link available for user selection 1230. The device detects that the limited use link has been selected 1235, and invokes the download client 1240. The download client queries the distribution server whether download is permitted and provides one or more network id(s) 1245.

The distribution server checks if the network id(s) in the query are in the list of network ids given by the data item provider 1250. Download is permitted if the network id is in the list and prohibited if the network id is not in the list 1250. If download is permitted, the download client downloads the data item 1255. If the distribution server prohibits download, the download client does not download the data item 1260. Optionally download client displays a message on the device indicating that a data item was not downloaded.

In summary, the above described embodiments enable controlling the download of data items to devices via an interaction between a download client on the device and distribution server(s). Data items may be downloaded only if specified download constraints are fulfilled. When a limited use link is selected, a download client is invoked on the device in order to obtain permission for the download from a distribution server. The distribution server enforces the constraints specified for the data item and prohibits download and/or installation if the download and/or installation constraints are not met.

It is expected that during the life of a patent maturing from this application many relevant devices, servers, data items, apps, links, deep links and clients for devices will be developed and the scope of the terms device, server, data item, app, link, deep link and client are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A distribution server for improved controlling of data item downloads by client devices, comprising a processing circuitry with at least one hardware processor configured to:

receive from at least one data item provider, over a communication network a request for a link to a data item stored in a data repository, said request comprising at least one download constraint for said data item, wherein said data item is not received and not stored by said distribution server;

generate said link, in response to said request, wherein said link is associated with said data item and said at least one download constraint, and wherein the link being valid for limited distribution of said data item;

return to said at least one data item provider said generated link;

store said at least one download constraint for said respective data item on at least one storage device;

receive over said communication network, from a user device that identified an activation of said link by a user of said user device, a query for permission to download said data item stored in said data repository;

access said at least one storage device and retrieve said at least one download constraint; and control downloading of said data item by said client device by:

upon determination that said respective download constraints are met, instructing said user device, over said communication network, to download said data item; and upon determination that said respective download constraints are unmet, instructing said user device not to download said data item.

2. The distribution server of claim 1, wherein said at least one download constraint comprises a device list comprising respective identifiers of at least one device permitted to download said data item, said query comprises a device identifier, and said download constraint is met when said device identifier in said query is present in said device list and unmet when said device identifier in said query is absent from said device list.

3. The distribution server of claim 1, wherein said at least one download constraint comprises a network list comprising respective identifiers of at least one network permitted for downloading said data item, said query comprises a network identifier, and said download constraint is met when said network identifier in said query is present in said list and unmet when said network identifier in said query is absent from said network list.

4. The distribution server of claim 1, wherein said at least one download constraint comprises a maximum download count for said data item, said download constraint being met when a current download count maintained by said distribution server is less than said maximum download count and unmet when said current download count is at least said maximum download count.

5. A device adapted to run software applications, comprising a processing circuitry with at least one hardware processor configured to:

identify a selection conducted by user of a link for downloading a data item stored in a data repository and having download constraints, said selection is conducted by said user by interacting with a first software application running on said device; and in response to said identifying, invoke an execution of a second software application that:

queries, through a communication network, a distribution server for permission to download said data item from said data repository, wherein said distribution server does not store said data item;

upon reception of instructions from said distribution server, through said communication network, to download said data item to said device, download said data item from said data repository not stored by said distribution server; and upon reception of instructions from said distribution server, through said communication network, not to download said data item to said device, perform a download failure action;

wherein upon completion of said download, said execution of said second application further conduct one of:

automatically opening said data item, and automatically executing program instructions contained in said data item, when said data item comprises program instructions.

6. The device of claim 5, wherein said download failure action comprises at least one of: displaying a download failure message on a display associated with said device and redirecting said device to a web page comprising a link to said data item.

7. The device of claim 5, wherein said query comprises at least one of an identifier of said device and an identifier of a network said device is communicating over.

8. The device of claim 5, wherein said data item is downloaded directly from said data repository.

9. The device of claim 5, wherein said second software application runs in the background.

10. The device of claim 5, wherein said processing circuitry automatically opens said data item upon completion of said download.

11. The device of claim 5, wherein said downloaded data item comprises program instructions and said processing circuitry automatically executes said program instructions when said downloading is complete.

12. The device of claim 5, wherein said second software application prompts for user confirmation of said download of said data item prior to said download and performs said download only when said user confirmation is obtained.

13. A method for improved controlling, by a server, of data item downloads by client devices, comprising:

by at least one hardware processor of a processing circuitry of said server:

receiving from at least one data item provider, over a communication network a request for a link to a data item stored in a data repository, said request comprising at least one download constraint for said data item, wherein said data item is not received and not stored by said server;

generating said link, in response to said request, wherein said link is associated with said data item and said at least one download constraint, and wherein the link being valid for limited distribution of said data item;

returning to said at least one data item provider said generated link;

storing said at least one download constraint for said respective data item on at least one storage device;

receiving over said communication network, from a user device that identified an activation of said link by a user of said user device, a query for permission to download said data item stored in said data repository;

accessing said at least one storage device and retrieving said at least one download constraint; and controlling downloading of said data item by said client device by:

upon determination that said respective download
constraints are met, instructing said user device,
over said communication network, to download
said data item; and upon determination that said respective download
constraints are unmet, instructing said user device
not to download said data item.

14. The method of claim 13, wherein said at least one
download constraint comprises a device list comprising
respective identifiers of at least one device permitted to
download said data item, said query comprises a device
identifier, and said download constraint is met when said
device identifier in said query is present in said device list
and unmet when said device identifier in said query is absent
from said device list.

15. The method of claim 13, wherein said at least one
download constraint comprises a network list comprising
respective identifiers of at least one network permitted for
downloading said data item, said query comprises a network
identifier, and said download constraint is met when said
network identifier in said query is present in said list and
unmet when said network identifier in said query is absent
from said network list.

16. The method of claim 13, wherein said at least one
download constraint comprises a maximum download count
for said data item, said download constraint being met when
a current download count maintained by said server is less
than said maximum download count and unmet when said
current download count is at least said maximum download
count.

* * * * *